United States Patent
Lakshminarayana et al.

(10) Patent No.: US 7,319,555 B2
(45) Date of Patent: Jan. 15, 2008

(54) INTEGRATED PERFORMANCE MONITORING, PERFORMANCE MAINTENANCE, AND FAILURE DETECTION FOR PHOTONIC REGENERATORS

(75) Inventors: Ganesh Lakshminarayana, Plainsboro, NJ (US); Ruomei Mu, East Brunswick, NJ (US); Hongsheng Wang, Bound Brook, NJ (US); Jithamithra Sarathy, Atlantic Highlands, NJ (US); Boris Stefanov, Gillette, NJ (US)

(73) Assignee: Alphion Corporation, Princeton Junction, NJ (US)

( * ) Notice: Subject to any disclaimer, the term of this patent is extended or adjusted under 35 U.S.C. 154(b) by 0 days.

(21) Appl. No.: 11/412,435

(22) Filed: Apr. 27, 2006

(65) Prior Publication Data

US 2007/0008613 A1    Jan. 11, 2007

Related U.S. Application Data

(60) Provisional application No. 60/675,257, filed on Apr. 27, 2005.

(51) Int. Cl.
*H01S 3/00* (2006.01)
(52) U.S. Cl. .................................................. 359/344
(58) Field of Classification Search ................ 359/344
See application file for complete search history.

(56) References Cited

U.S. PATENT DOCUMENTS

| | | | |
|---|---|---|---|
| 5,434,692 A | 7/1995 | Auffret et al. | |
| 5,754,714 A | 5/1998 | Suzuki et al. | |
| 5,798,852 A | 8/1998 | Billes et al. | |
| 5,999,293 A | 12/1999 | Manning | |
| 6,118,564 A | 9/2000 | Ooi et al. | |
| 6,122,306 A | 9/2000 | Sartorius et al. | |
| 6,226,090 B1 | 5/2001 | Yoneyama | |
| 6,229,633 B1 | 5/2001 | Roberts et al. | |
| 6,271,961 B1 | 8/2001 | Emery et al. | |
| 6,335,813 B1 | 1/2002 | Janz et al. | |
| 6,366,382 B1 | 4/2002 | Morthier et al. | |
| 6,384,954 B1 | 5/2002 | Webb | |
| 6,388,753 B1 | 5/2002 | Hall et al. | |
| 6,636,318 B2 | 10/2003 | Sarathy et al. | |
| 7,116,851 B2 * | 10/2006 | Welch et al. | ............. 385/14 |

(Continued)

FOREIGN PATENT DOCUMENTS

EP    0 901 245 A1    10/1998

(Continued)

OTHER PUBLICATIONS

Puleo, M. 40 Gbit/s OTDM-WDM transmultiplexers. Conference Digest. Lasers and Electro-Optics Europe, 2000. Sep. 10-15, 2000.*

(Continued)

*Primary Examiner*—Deandra M Hughes
(74) *Attorney, Agent, or Firm*—Kaplan Gilman Gibson & Dernier LLP

(57) ABSTRACT

Monitoring of the input power is performed on-chip and is used to monitor and maintain performance, detect failure and trigger network protection strategies. An optical power-monitoring technique uses a photodetector monolithically integrated with the semiconductor optical amplifier—Mach-Zehnder interferometer circuit to monitor the P2R device and keep the output stable while the input power varies.

10 Claims, 3 Drawing Sheets

U.S. PATENT DOCUMENTS

| | | | | |
|---|---|---|---|---|
| 7,154,665 | B2* | 12/2006 | Kilper et al. | 359/344 |
| 7,167,620 | B2* | 1/2007 | Handelman | 385/122 |
| 2001/0053008 | A1 | 12/2001 | Ueno | |
| 2005/0249509 | A1* | 11/2005 | Nagarajan et al. | 398/198 |

FOREIGN PATENT DOCUMENTS

| | | |
|---|---|---|
| GB | 2302225 | 1/1997 |
| JP | 411101922 A | 4/1998 |
| WO | WO 93/22855 | 11/1993 |

OTHER PUBLICATIONS

All-Optical Timing Extraction . . . Nov. 10, 1988 vol. 24 No. 23 Electronics Letters.

All-Optical Clock Recovery . . . P. E. Barnsley, et al. Oct. 1991 IEEE Photonics Tech.

A High-Speed Photonic Clock and Carrier Regenerator, by X.S. Yao, TDA Progress Report 42-121, May 15, 1995, p. 202-210.

Rees et al. A Theorectical Analysis of Optical Clock Extraction Using a Self-Pulsing Laser Diode. IEEE Journal of Quantum Elect. vol. 35 No. 2, pp. 221-227. Feb. 1999.

All-Fiber-Optic Clock Recovery from non-return to zero format data—Hak Kyu Lee Feb. 1998 Optical Fiber Comm. Conference.

20 Gbit/s all-optical regeneration and wavelength conversion . . . G. Raybon Feb. 1999 Optical Fiber Comm. Conf.

40-Gb/s All-optical wavelength conversion . . . D. Wolfson et al. Mar. 2000 IEEE Photonics Tech.

Optical 3R Regenerator Using Wavelength Converters . . . T. Otani Apr. 2000 IEEE Photonics Tech.

All-Optical 3R regenerators: Status and Challenges F. Devaux Apr. 2000.

Frequency Conversion and Analysis Martin Zirngibl May 2000 CLEO.

All-Optical 3R Regeneration B. Lavigne et al. Nov. 2000 Lasers & Electro-Optics.

Nonlinear Dynamics for All-Optical 3R Regeneration Guifang Li et al. Nov. 2000 Lasers & Electro-Optics.

All-Optical Clock Recovery for 3R Optical Regeneration Bernd Sartorius Mar. 2001 Optical Fiber Comm. Conf.

Ultrafast Wavelength and Polarization Insensitive All-Optical Clock Recovery Weiming Mao et al. Mar. 2001 Optical Fiber Comm. Conf.

Optical sampling measurement with all-optical clock recovery using mode-locked diode lasers M. Shirane, et al. Mar. 2001 Optical Fiber Comm. Conf.

Lee et al. All-fiber-optic clock recovery from non-return-to-zero format data. Electronics Letters. Mar. 5, 1998. vol. 34. No. 5 pp. 478-480.

Lee et al. Passive all optical non-return-to-zero signal conversation for all optical clock recovery. LEOS 1996. pp. 113-114.

\* cited by examiner

INTEGRATED PERFORMANCE MONITORING, PERFORMANCE MAINTENANCE, AND FAILURE DETECTION FOR PHOTONIC REGENERATORS

CROSS REFERENCE TO RELATED APPLICATIONS

The present patent application claims priority from U.S. Provisional Patent Application No. 60/675,257, filed Apr. 27, 2005, the entirety of which is incorporated herein by reference.

BACKGROUND OF THE INVENTION

Noise and attenuation in long-haul optical line systems result in the deterioration of the transmitted signal, both as to its amplitude as well as its shape. Consequently, one of the fundamental requirements of nodal equipment in optical networks is the capability to regenerate and reshape the optical pulses. These functions are known as P2R, for photonic regeneration and reshaping, which is a low-cost alternative to opto-electronic transponders at network nodes that do not require data access. P2R devices can be bit-rate and data-format insensitive, which is a key advantage in system design for multi-protocol transport systems, and a signal-quality monitoring methodology that is insensitive to bit-rate and data-format is essential for implementing P2R devices in optical networks.

One well-known method for implementing P2R devices uses cross phase modulation in semiconductor optical amplifier-Mach-Zehnder interferometer (SOA-MZI) photonic integrated circuits in the Indium Phosphide materials system [1]. The ability to integrate multiple active and passive elements, operating in the C- and L-band of the optical spectrum on a single chip, is a significant advantage of this device technology. Commercial P2R devices with gains of over 10 db, which operate at up to 10 GHz over the entire C-band, have been demonstrated [2]. In addition, advanced P2R device architectures capable of achieving speeds of up to 40 GHz have been demonstrated [3].

While past work has focused on demonstrating the feasibility of P2R technology, the present invention makes P2R devices system-ready. In an optical network, power variations arising out of transients or as a precursor to failure can cause signal degradations that can propagate throughout the network. In order to arrest this propagation, optical regenerators within the network must either possess a large input power dynamic range or be able to monitor input power variations to adjust the operating set points of the regenerator.

SUMMARY OF THE INVENTION

In accordance with the present invention, monitoring of the input power with on-chip, monitoring is used to monitor and maintain performance, detect failure and trigger network protection strategies. An optical power-monitoring technique using a photodetector monolithically integrated with the semiconductor optical amplifier-Mach-Zehnder interferometer circuit to monitor the P2R device and keep the output power and signal quality stable while the input power varies.

BRIEF DESCRIPTION OF THE DRAWINGS

The forgoing brief description, and further objects features and advantages of the present invention will be understood more completely from the following detailed description of a presently preferred, but nonetheless exemplary, embodiment, with reference being had to the accompanying drawings in which.

DETAILED DESCRIPTION OF THE PREFERRED EMBODIMENT

Figure 1:
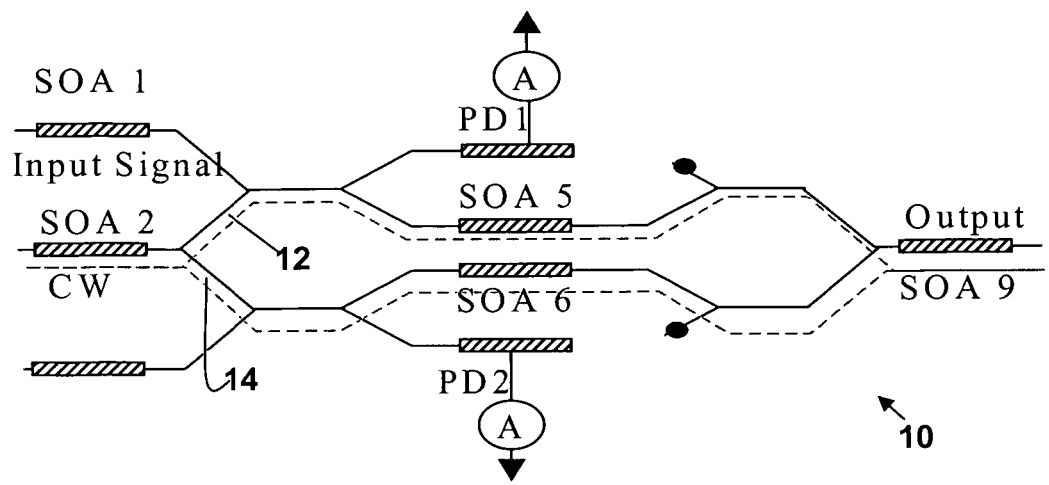
FIG. 1 is a schematic representation of a photodetector integrated semiconductor optical amplifier—Mach-Zehnder interferometer circuit device with circuit monitoring.

FIG. 1 is a schematic representation of a photodetector integrated semiconductor optical amplifier-Mach-Zehnder interferometer circuit device 10 with circuit monitoring. The transmission degraded pump signal is pre-amplified at SOA1. The probe (local laser signal) enters the chip at SOA2 and is held in destructive interference in the circuit device 10. The probe is then split between an upper branch 12 and a lower branch 14. The upper branch 12 being combined with the pre-amplified pump and then split between PD1 and SOA5. The pre-amplified pump changes the phase of the probe signal in SOA5, thereby gating the probe signal as a function of the amplified pump signal. Regeneration and wavelength conversion are achieved because cross phase modulation transfers the data in the pump to the probe. The probe signal in lower branch 14 is split between SOA6 and PD2. PD1 and PD2 are sensing points at which the combined pump and probe power, and probe power, respectively, may be sensed. Using the sensed optical power, an external electronic control circuitry adjusts the bias currents applied to SOA1 and SOA6.

When the input power to a P2R device changes, the phase change induced on the MZI arm SOA5 changes. This leads to a change in the output characteristics of the probe signal. In the disclosed embodiment, the change in the input optical power also causes a change in the photocurrent in the detector PD1. Using this photocurrent, and the drive current to the pre-amplifier, the input power to the P2R can be computed. Once the input power is known, the various SOA drive currents of the device are set to pre-computed values for that input power. Variations beyond the operational range of the device are detected as network level power failures and used to trigger restoration. In addition, if the local laser or SOA2 fails, both the photocurrent monitors PD1 and PD2 are affected. Therefore, by observing the photocurrents in different arms of the P2R device, different classes of input failure can be distinguished.

Besides maintaining the output stable, the present invention has the advantage that, since use is made of an on-chip integrated monitor, devices in accordance with the present invention are more compact than alternatives that use discrete components, such as power taps, to achieve the same effect. In addition, using the residual polarization sensitivity of the gain medium it is possible to observe and compensate for other input properties, such as polarization, which cannot be inferred readily through discrete components.

Table 1 shows the current density in the input stage and interferometric arms (SOA5 and SOA6) of the device for different values of input power, along with the photocurrents measured in PD1 and PD2. These relate to a preferred embodiment of P2R devices with monolithically integrated photodetectors.

Figure 2:
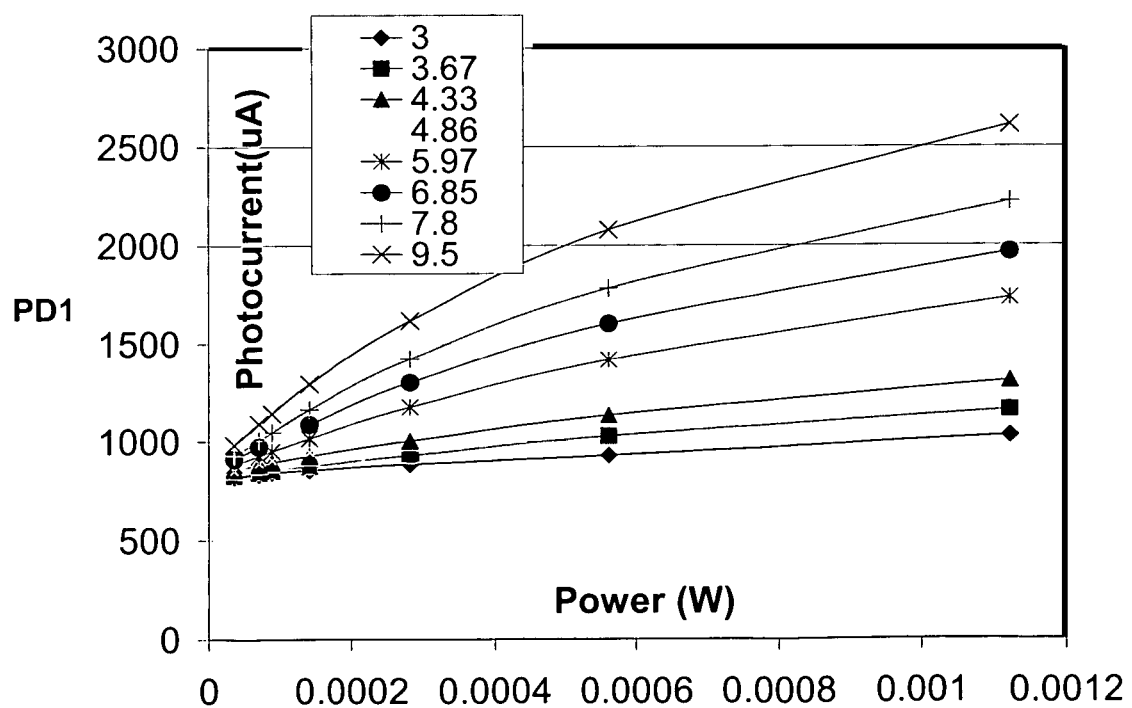
FIG. 2 is a graph showing the photocurrent as a function of input power and preamplifier drive current density on SOA1.

FIG. 2 shows the photocurrent as a function of input power for different preamplifier drive current densities in SOA1. This graph was obtained by measuring an actual device in operation.

Figure 3:
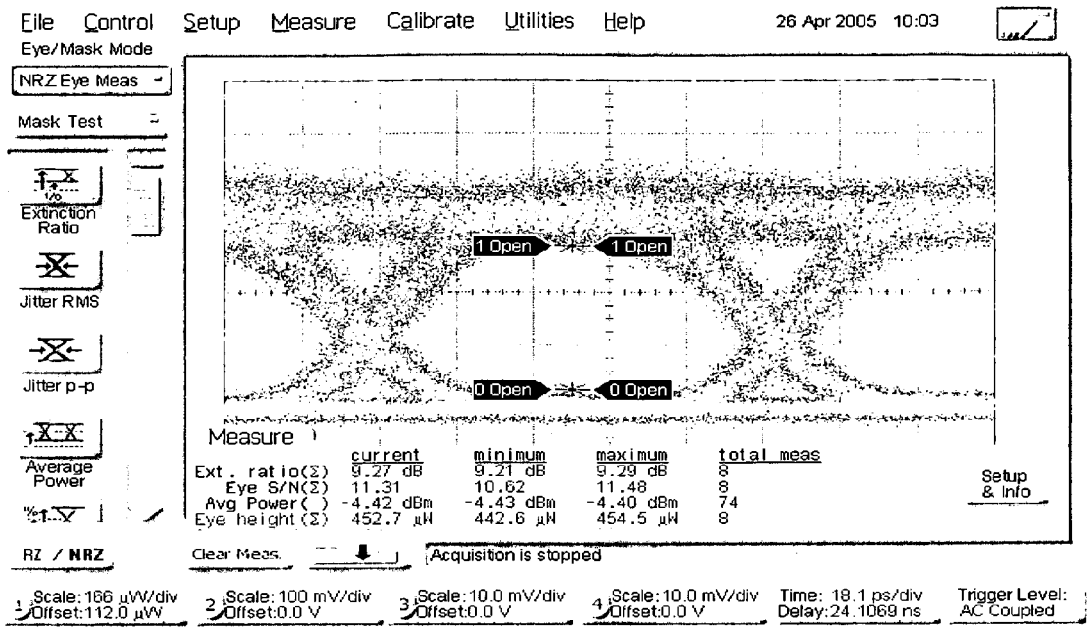
FIG. 3 is an output eye diagram at 10 Gb/s for a presently preferred P2R device, derived for an input power of −8.5 dBm.
Figure 4:
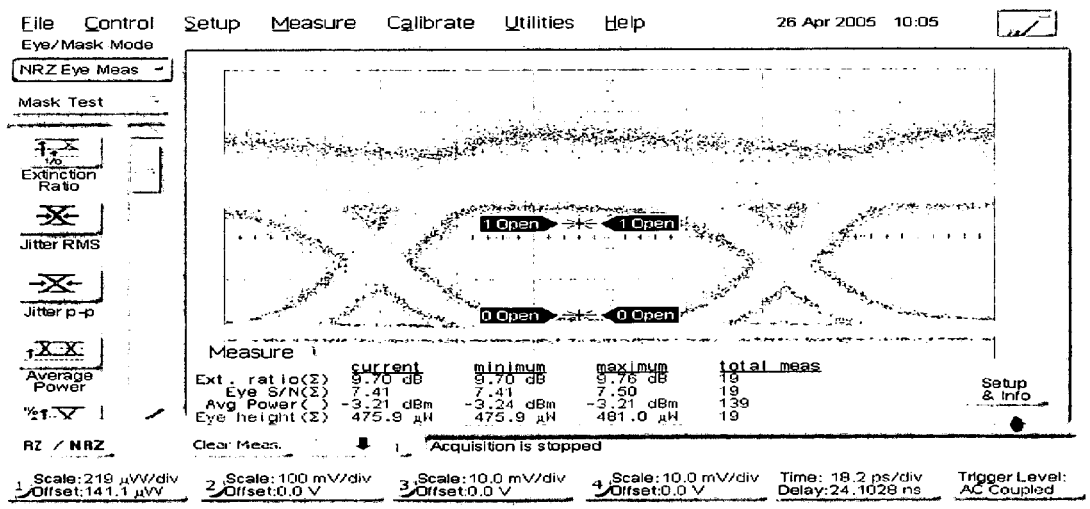
FIG. 4 is a degraded output eye diagram as in FIG. 3, with the input power reduced from −8.5 dBm to −6.8 dBm.

FIG. 3 shows an output eye diagram at 10 Gb/s for a presently preferred P2R device, derived for an input power of −8.5 dBm. This diagram shows output power as a function of time for superposed positive and negative pulses between logical 1 and logical 0 signal levels. The photocurrent monitoring technique of the present invention is capable of maintaining the output performance not only at the characterized points, but also everywhere in-between. This is demonstrated by changing the input probe power to the device from −8.5 dBm to −6.8 dBm, resulting in the degraded eye (Note the reduction in "Eye S/N") shown in FIG. 4. As a result, the photocurrent in PD1 changes from 1096 µA to 1077 µA. Using a linear interpolation of PD1_new with respect to the input power, the new input pump power was calculated as follows:

$$PD1_{new} = Y \times PD1_{-8.5} + (1-Y)PD1_{-5.5}$$

Where $PD1_{new}$ is the new value of PD1 current (i.e. 1077 µA) and PD1 −8.5 and PD1 −5.5 are the values of PD1 current corresponding to −8.5 dBm and −5.5 dBm, respectively. Inserting the value for $PD1_{New}$, one can solve for Y. Then the new input power, $P_{new}$ can be calculated from:

$$P_{new} = Y \times P_{-8.5} + (1-Y)P_{-5.5}$$

where $P_{-8.5}$ and $P_{-5.5}$ are the power levels at −8.5 and −5.5 dBm, respectively. This results in the input being at a power level corresponding to −6.8 dBm. Those skilled in the art will appreciate that this interpolation would normally be done on a computer at the site which has been programmed with the values in Table 1 and FIG. 2 and which controls the bias currents provided to SOA1 and SOA6 in manner well known to those skilled in the art.

Figure 5:
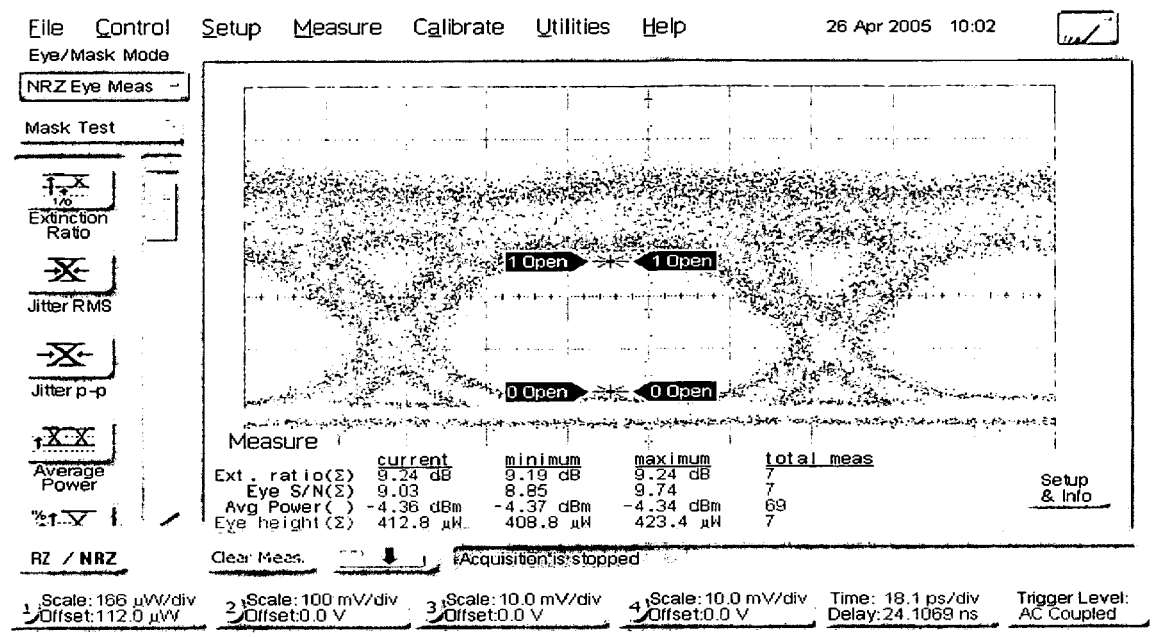
FIG. 5 is a restored output eye diagram as in FIG. 4, which is obtained after the drive set-points of the device are adjusted in accordance with Table 1.

Using the set point information in Table 1, the drive set-points of the semiconductor optical amplifier—Mach-Zehnder interferometer circuit 10 (the bias currents to SOA1 and SOA6) were adjusted to obtain the restored eye diagram shown in FIG. 5. The improved "Eye S/N should be noted. At the same time, the output power remained unchanged at −4.4 dBm, thereby maintaining the quality of the output signal from the semiconductor optical amplifier-Mach-Zehnder interferometer circuit 10. Subsequently, the new input pump power was measured to be exactly −6.8 dBm. This measurement was repeated for a number of set-points between −5.5 dBm and −10.5 dBm with similar results.

TABLE 1

SOA Drive Current Densities and Photocurrents for Different Input Power Levels

| Input Power (dBm) | SOA 1 Current Density (kA/cm$^2$) | SOA 6 current Density (kA/cm$^2$) | PD1 Photo-current (µA) | PD2 Photo-current (µA) |
|---|---|---|---|---|
| −10.5 | 9.5 | 11.7 | 1144 | 626 |
| −9.5 | 7.8 | 11.61 | 1101 | 626 |
| −8.5 | 6.85 | 11.53 | 1096 | 626 |
| −5.5 | 4.86 | 11.34 | 1057 | 625 |
| −2.5 | 3.67 | 11.21 | 1032 | 625 |
| +0.5 | 3 | 11.08 | 1018 | 621 |

It is a feature of one aspect of the present invention that an integrated performance monitoring, maintenance, and restoration triggering mechanism for P2R devices, in additional to being compact and economical, is capable-of maintaining P2R performance over a wide range of input power, and promptly isolating and reporting failure beyond the operational range of the device.

Although a preferred embodiment of the invention has been disclosed for illustrative purposes, those skilled in the art will appreciate that many additions, modifications and substitutions are possible without departing from the scope and spirit of the invention as defined by the accompanying claims.

REFERENCES

1. T. Durhuus et al., "All optical wavelength conversion by semiconductor optical amplifiers", J. Lightwave Technology, Vol. 14, No 6, pp. 942-954, June '1996
2. G. Lakshminarayana et al., "A new architecture for counter-propagation based photonic regeneration and reshaping", OFC 2005
3. P. Guerber et al., "Ultimate performance of SOA-based interferometer as decision element in 40 Gbit/s all-optical regenerator", OFC'02, pp. 17-22

What is claimed:

1. A method for monitoring the performance of an integrated photonic regenerator device, including a first semiconductor optical amplifier (SOA) receiving an input signal and providing an amplified output signal and a second SOA receiving as an input at least a portion of the amplified output signal, the method comprising:
    sensing photocurrent in the second SOA;
    utilizing the value of the current as a measure of the performance photonic regenerator device; and
    utilizing the value of the current to control a bias current applied to the first SOA.

2. A method for monitoring the performance of an integrated photonic regenerator device, including a first semiconductor optical amplifier (SOA) receiving an input signal and providing an amplified output signal and a second SOA receiving as an input at least a portion of the amplified output signal, the method comprising sensing photocurrent in the second SOA and utilizing the value of the current as a measure of the performance photonic regenerator device, wherein the value of the current is processed to obtain an estimate of the input power to the first SOA, and wherein the value of the current is processed in conjunction with a bias current applied to the first SOA.

3. A method for monitoring the performance of an integrated photonic regenerator device, including a first semiconductor optical amplifier (SOA) receiving an input signal and providing an amplified output signal and a second SOA receiving as an input at least a portion of the amplified output signal, the method comprising sensing photocurrent in the second SOA and utilizing the value of the current as a measure of the performance photonic regenerator device,
wherein the value of the current is processed to obtain an estimate of the input power to the first SOA,
and wherein the method further comprises utilizing the estimate of the input power to control a bias current applied to the first SOA.

4. A method for monitoring the performance of an integrated photonic regenerator device, including a first semiconductor optical amplifier (SOA) receiving an input signal and providing an amplified output signal and a second SOA receiving as an input at least a portion of the amplified output signal, the method comprising sensing photocurrent in the second SOA and utilizing the value of the current as a measure of the performance photonic regenerator device,
wherein the method is performed with a device receiving a probe input and having a third SOA receiving a portion of the probe input, the method further sensing photocurrent in the third SOA and utilizing the value of that current together with the value of the second SOA photocurrent as a measure of the performance of the photonic regenerator device.

5. The method of claim 4 further comprising utilizing the value of photocurrent in the third SOA together with the value of the second SOA photocurrent to control a bias current applied to the first SOA.

6. The method of claim 5 wherein the value of the second SOA photocurrent is processed to obtain an estimate of the input power to the first SOA.

7. The method of claim 6 utilized in a device having a fourth SOA, the bias current to at least one of the first and fourth SOAs being controlled by values of the second and third SOA photocurrents which are controlled so as to maintain a predetermined relationship between a value of one of the bias currents and the estimate of the input power to the first SOA.

8. The method of claim 4 utilized in a device having a fourth SOA and further comprising utilizing the value of photocurrent in the third SOA together with the value of the second SOA photocurrent to control a bias current applied to the fourth SOA.

9. The method of claim 4 wherein the value of the second SOA photocurrent is processed to obtain an estimate of the input power to the first SOA.

10. The method of claim 9 utilized in a device having a fourth SOA, the bias current to at least one of the first and fourth SOAs being controlled by values of the second and third SOA photocurrents which are controlled so as to maintain a predetermined relationship between a value of one of the bias currents and the estimate of the input power to the first SOA.

* * * * *